United States Patent [19]
Brownstein

[11] Patent Number: 6,064,469
[45] Date of Patent: May 16, 2000

[54] APPARATUS AND METHOD FOR PROCESSING IMAGES USING A RECIPROCATING EASEL

[75] Inventor: Scott Brownstein, Rochester, N.Y.

[73] Assignee: Applied Graphics Technologies, Inc., New York, N.Y.

[21] Appl. No.: 08/705,751

[22] Filed: Aug. 30, 1996

[51] Int. Cl.[7] ............................ G03B 27/62; G03B 27/64; G03B 27/00
[52] U.S. Cl. .................................. 355/76; 355/18; 355/75
[58] Field of Search ............................ 355/18, 72, 75, 355/76; 271/3.11, 91, 93, 97, 98

[56] References Cited

U.S. PATENT DOCUMENTS

| | | | |
|---|---|---|---|
| 3,276,312 | 10/1966 | Florsheim, Jr. et al. . | |
| 3,639,059 | 2/1972 | Strumor et al. | 355/66 |
| 4,043,662 | 8/1977 | Garfall | 355/71 |
| 4,165,934 | 8/1979 | Zimmet | 355/55 |
| 4,199,251 | 4/1980 | Zimmet | 355/64 |
| 4,518,251 | 5/1985 | Larsson | 355/75 |
| 4,592,647 | 6/1986 | Seto | 355/40 |
| 4,676,629 | 6/1987 | Vanhauwaert | 355/53 |
| 5,247,330 | 9/1993 | Ohyama et al. | 355/64 |
| 5,321,681 | 6/1994 | Ramsay et al. | 369/69 |
| 5,613,671 | 3/1997 | Fricke et al. | 271/91 |

*Primary Examiner*—Richard Moses
*Assistant Examiner*—Shival Virmani
*Attorney, Agent, or Firm*—Finnegan, Henderson, Farabow, Garrett & Dunner, L.L.P.

[57] ABSTRACT

An apparatus and method is provided for processing images such as photographs or magazine pages. The computer-driven apparatus includes a reciprocating easel which moves along railings under an image capture device such as a camera. Vacuum pickers pick up images which have been processed and drop them into image drop bins under computer control, thus freeing the human operator from moving images. Vacuum compartments on the reciprocating easel hold images securely in place while they are photographed but release them when they are not being photographed. A bar code scanner system may be used to track images and correlate the images with film frames in the camera. Translucent panels within the easel allow transparencies to be processed by illuminating the images from beneath the easel.

24 Claims, 10 Drawing Sheets

APPARATUS AND METHOD FOR PROCESSING IMAGES USING A RECIPROCATING EASEL

BACKGROUND OF THE INVENTION

1. Technical Field

This invention relates generally to a system for capturing and processing images such as photographs. More particularly, the invention provides a computerized apparatus and method for rapidly processing images using a reciprocating easel and bar codes to identify the images.

2. Related Information

Newspapers and magazines often have a need to capture and store a large number of photographs and other images for use in preparing news stories. For example, a news bureau may maintain a database of photographs in a computer storage device to be retrieved by an author or editor for a particular topic. When the news story is written, the author or editor finds a suitable photograph and inserts the photograph into the news story.

Other applications also require the capture and storage of large numbers of images. For example, it is often desirable to capture images of each page of a newspaper or magazine to create a computer database containing all issues of a magazine or newspaper. Pages from old issues of a magazine may need to be digitized and stored in a computer to provide such a database.

Conventionally, images and photographs have been digitized and stored in computer files using a manual process. For example, a person places a photograph on a digitizing table arranged to hold a single photograph and presses a button to cause the image to be captured and stored in a computer. The person then manually removes the photograph, places the next photograph on the digitizing table, and repeats the process. Rather than scanning or digitizing photographs directly, some systems instead involve steps of re-photographing the original photograph and then scanning the film in a scanner to produce a digitized image.

Conventional methods of capturing and storing images become tedious and labor intensive when a large number of photographs are to be stored. In particular, when a large number of images are to be captured, the time required to manually place and remove the images during the capture process is typically the limiting factor in speeding up the process. Moreover, conventional techniques of processing images using identification labels such as non-unique photograph titles are problematic and unwieldy. Purchasing a large and expensive assembly-line type photographic imaging system, however, even if it were capable of solving such problems, may not be cost effective.

Accordingly, there is a need to provide a system which can quickly and efficiently capture and store graphic images in a computer storage device and associate the stored images with unique identification labels on the photographs.

SUMMARY OF THE INVENTION

The present invention provides an apparatus and method for rapidly capturing and storing images in a computer system and associating bar codes with the stored images. In various embodiments, the apparatus includes a reciprocating two-sided easel onto which images are placed and a camera mounted above the easel. Vacuum pickers disposed above the reciprocating easel automatically pick up images after an image capture step and drop them into a bin. The apparatus operates under computer control to reduce the number of manual tasks needed to capture a set of images.

In various embodiments, the invention includes a bar code scanner for scanning bar codes attached to images such as photographs. The bar codes may be generating using a conventional bar code generation program operating on a computer.

After scanning the bar code on each image, the image is placed on a reciprocating easel and the image is captured in a computer-controlled camera. The computer maintains an association between the bar code and the frame number of film in the camera for later use. Film from the camera is then developed, cut into smaller strips such as 36-frame segments, and digitized through the use of a scanner using a process which references the stored photograph association information. Captured images may then be stored in the computer and associated with the bar codes, providing an easy method of correlating stored images with the original photographs.

Other features and advantages of the present invention will become apparent through the following detailed description, the figures, and the appended claims.

DETAILED DESCRIPTION OF THE PREFERRED EMBODIMENTS

Figure 1:
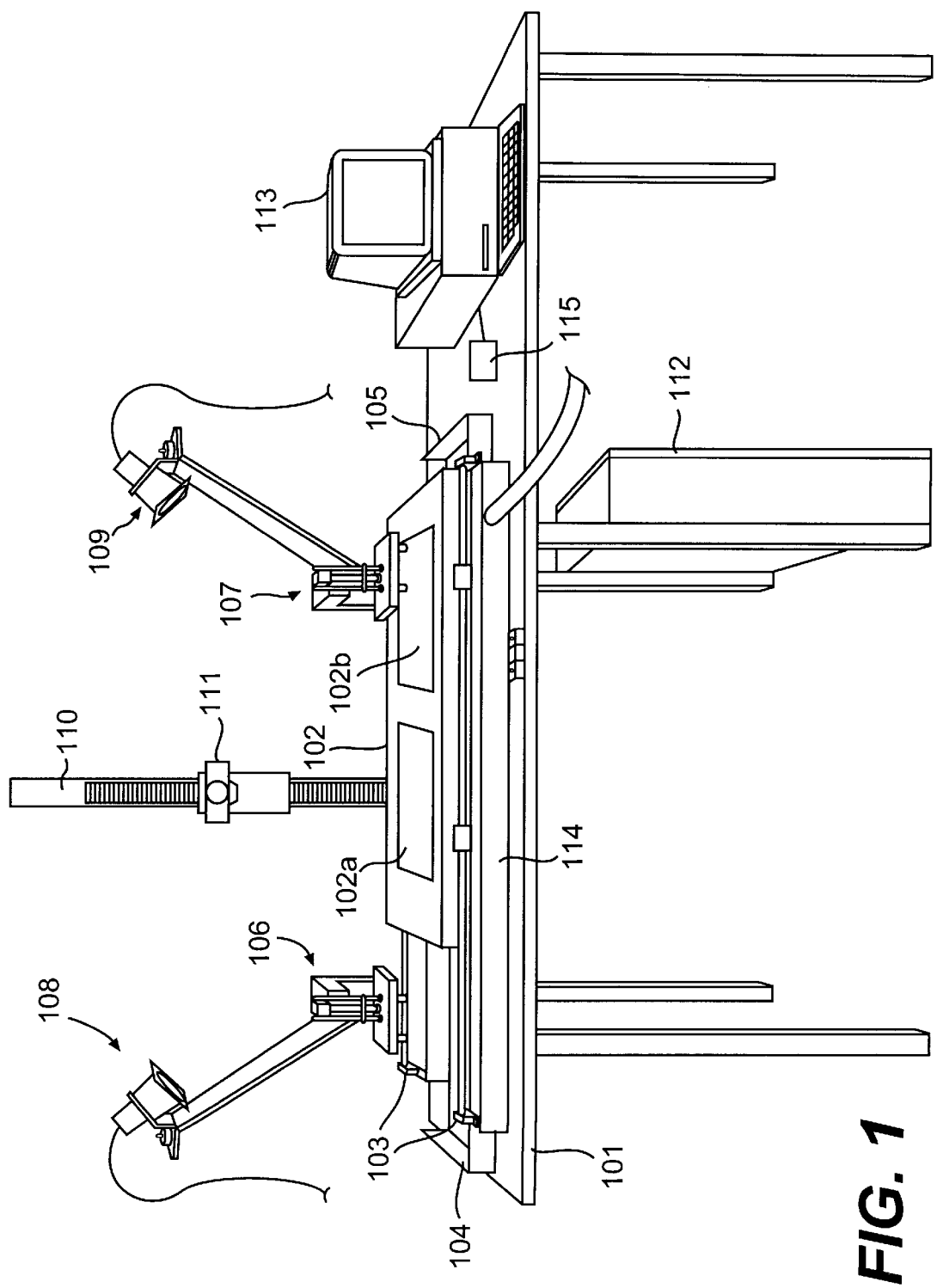
FIG. 1 shows a front view of an imaging apparatus employing various principles of the present invention.

FIG. 1 shows a front view of an apparatus which employs various principles of the present invention. As shown in FIG. 1, the apparatus includes a frame 114 which may be arranged atop a table or other platform 101. The apparatus includes a reciprocating easel 102 having a left image area 102a and a right image area 102b onto which images may be placed. Each image area preferably includes a perforated surface coupled to a vacuum source so that images placed on the image area are securably held thereon when moved under camera 111. Reciprocating easel 102 slides horizontally along a pair of railings 103 by means of a pneumatic system (not shown in FIG. 1).

A mounting backstop 110 is fixed to the frame for mounting an imaging device such as a high capacity computer controlled camera 111. Camera 111 may be slidably moved up and down the backstop to adjust the image size for images which are placed on reciprocating easel 102. A pair of strobe lights 108 and 109 are mounted above the easel and arranged to provide illumination for images placed on the easel. It will be appreciated that other imaging devices such as scanners or digitizing cameras may be used in place of a film camera.

A pair of vacuum pickers 106 and 107 are each mounted above the reciprocating easel at left and right positions. A corresponding pair of image drop bins 104 and 105 are disposed beneath the vacuum pickers to allow images which have been picked up by the pickers to be dropped. During operation, vacuum pickers 106 and 107 move up and down under computer control to pick up images from easel 102 and drop them into bins 104 and 105 after the easel has moved aware from the bins.

Reciprocating easel 102 may be controllably moved to either a left position or a right position (shown in FIG. 1) so that images may be captured by camera 111 regardless of the image placement area on which they are placed. As shown in FIG. 1, easel 102 is in the right position such that left image placement area 102a is disposed beneath camera 111 while right image placement area 102b is simultaneously disposed beneath right vacuum picker 107. When easel 102 is moved to the left position, right image placement area 102b is disposed beneath camera 111 while left image placement area 102a is disposed beneath left vacuum picker 106. In this manner, two images may be simultaneously placed on easel 102 (one beneath a picker and one beneath camera 111).

The apparatus of FIG. 1 also includes a computer 113 which controls the overall operation of the apparatus and a control housing 112 in which various pneumatic control valves and electronic circuits are arranged. A bar code scanning device 115 and a printer (not shown) are coupled to computer 113 to provide bar code scanning and printing functions. Further details of the various elements in FIG. 1 are explained below.

Figure 2:
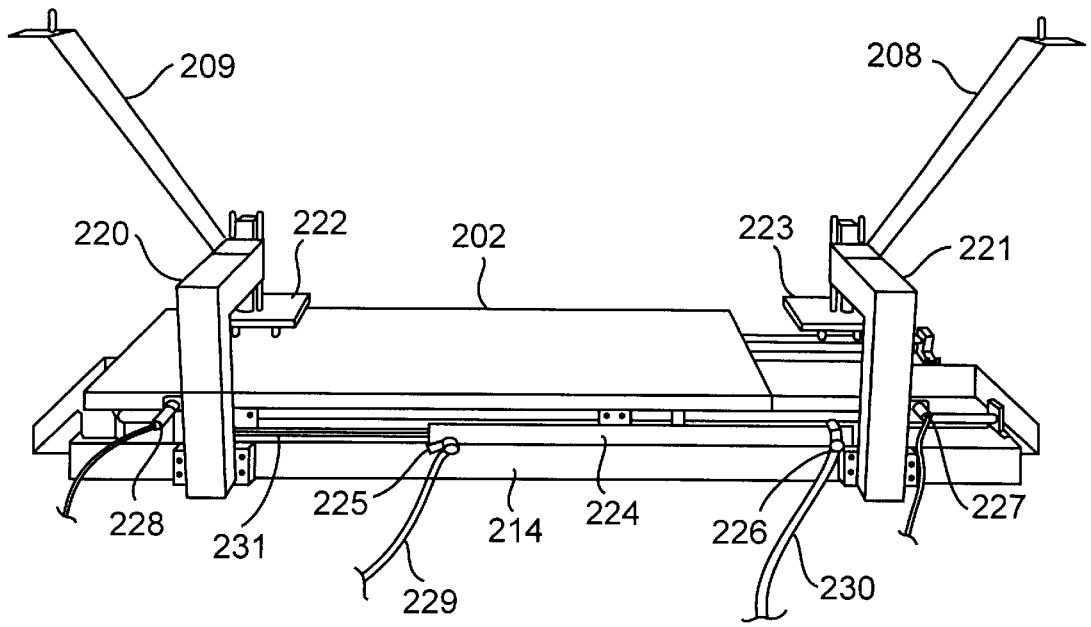
FIG. 2 shows a rear view of the imaging apparatus of FIG. 1.

FIG. 2 is a rear view of the apparatus of FIG. 1. In the figures, similar reference numerals have been used to refer to similar components. As shown in FIG. 2, two picker support members 220 and 221 are fixed to frame 214 to support each picker. Each picker includes a movable platen 222 and 223 which may be forcibly moved to a downward position by means of pneumatic control and returned to the up position by means of springs. Each platen includes suction cups (described below) for holding an image.

An air piston 224 is fixed to the rear of frame 214, and includes a movable rod 231 which is disposed therein and protrudes from both ends. Movable rod 231 is secured to reciprocating easel 202 so that movement of the rod causes a corresponding movement in easel 202 along the railings. Air piston 224 is fed by two air hoses 229 (through left fitting 225) and 230 (through right fitting 226), which are in turn coupled to an air pump through computer controlled air solenoid valves (ASVs). The air piston is generally arranged such that forcing air through left hose 229 causes the rod to move toward the right in FIG. 2, thus moving easel 202 along its railings to the right side. Conversely, forcing air through right hose 230 causes rod 231 to move toward the left, thus moving easel 202 in an opposite direction. It will be appreciated that instead of a single rod and cylinder, two separate cylinders and rods could instead be used to accomplish the identical function. Two proximity detectors 227 and 228 are attached to frame 214 near support members 220 and 221 respectively to detect the movement of easel 202 in each direction. Outputs of the proximity detectors are fed into computer 113 for detecting the position of easel 202.

Figure 3:
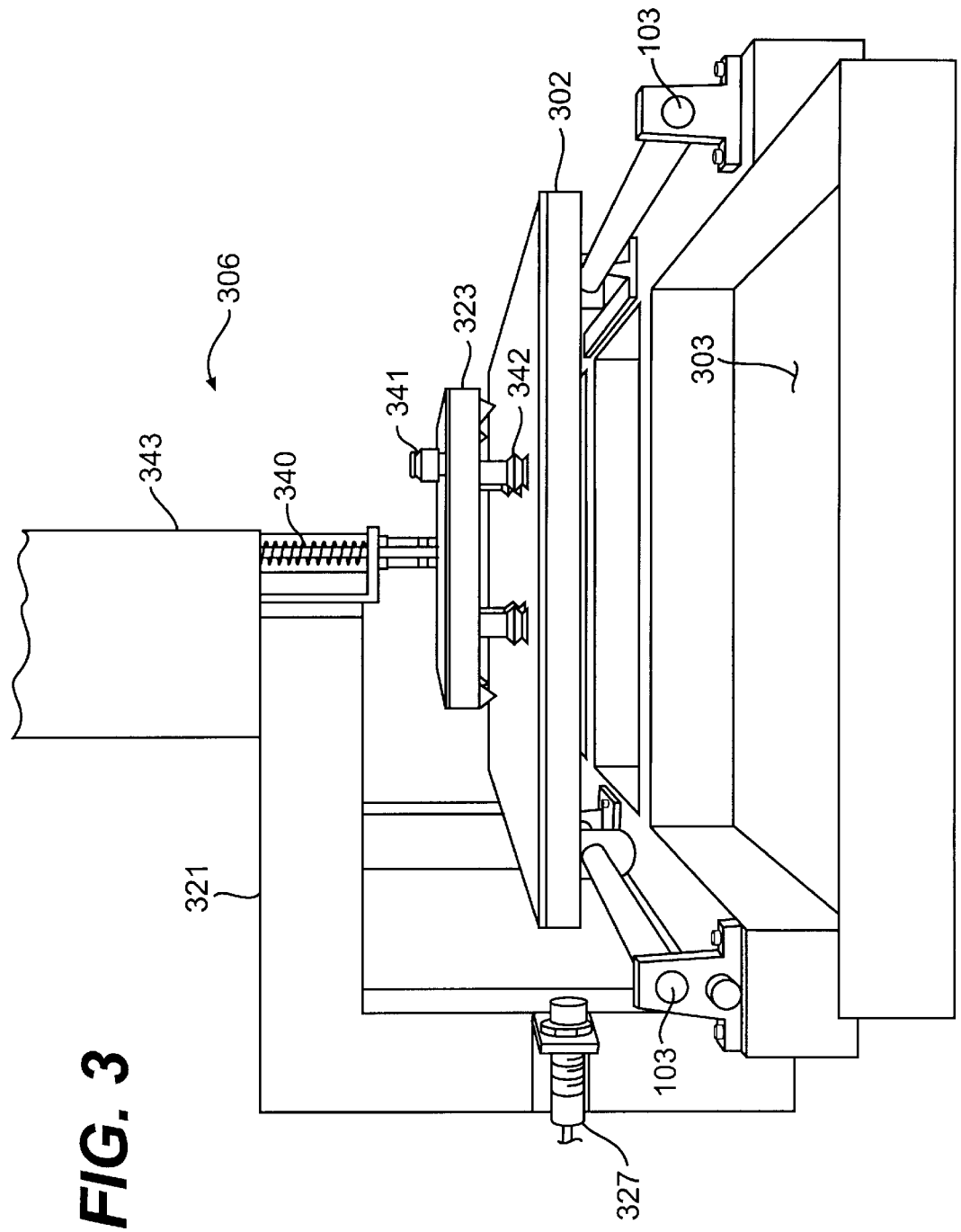
FIG. 3 shows a side view of the imaging apparatus of FIG. 1.

FIG. 3 shows a side view of the apparatus including left picker 306. The picker generally includes picker support member 321, spring 340, platen 323, and a compressed air piston (not shown) disposed above platen 323. Image drop bin 303 is arranged beneath picker 306 to receive images dropped from the picker.

In various embodiments, four suction cups 342 protrude from the bottom of platen 323 and are coupled to a vacuum source through vacuum chambers within platen 323. The vacuum chambers are coupled to a vacuum fitting 341 which is coupled to a vacuum system via a hose. An air piston forces platen 323 downward and compresses springs 340. When the air source is disengaged, springs 340 retract platen 323 to an up position.

During operation, platen 323 is forced downward when easel 302 is beneath picker 306. When the vacuum source is engaged, a vacuum flows through suction cups 342 which, when in contact with the image, attract the image to the platen. After platen 323 is raised and easel 302 is moved to an opposite side, the vacuum source is disengaged and the image drops into image bin 303.

Figure 4:
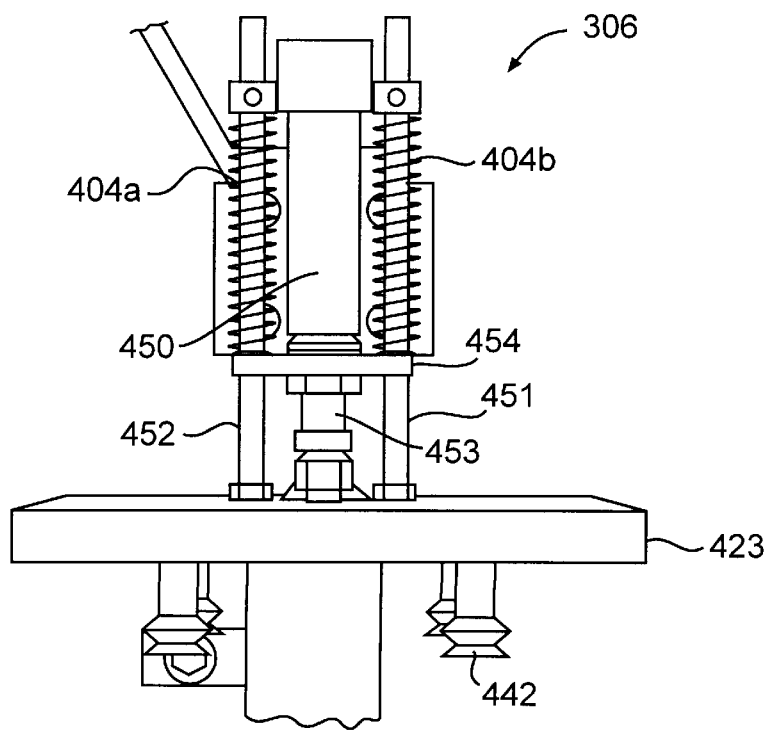
FIG. 4 shows a close-up view of a single vacuum picker including vacuum suction cups for picking up images.

FIG. 4 shows a front view of picker 306 including air piston 450. Two rods 451 and 452 are affixed to platen 423 through holes in frame member 454. Springs 404a and 404b urge the ends of rods 451 and 452 (and thus platen 423) upward by pressing against frame member 454. When air is forced into air piston 450, piston member 453 forces platen 423 downward so that suction cups 442 contact the image on the easel. When air piston 450 is released, springs 404a and 404b urge platen 423 back to its normal upward position.

Figure 5:
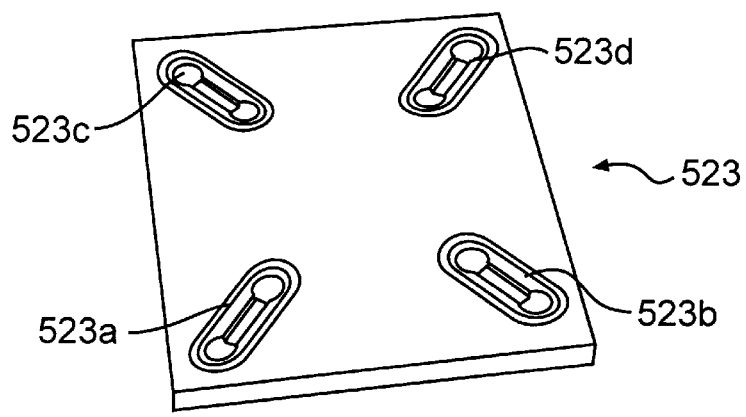
FIG. 5 shows a perspective view of the underside of one vacuum picker with the cover removed, exposing the vacuum chambers.

FIG. 5 shows platen 523 with its cover removed. The platen includes hollow vacuum chambers 523a through 523d each of which is in communication with a corresponding a suction cup on the bottom surface of platen 523. A vacuum fitting on the surface of platen 523 (not shown in FIG. 5) draws air through the vacuum chambers and thus through the suction cups.

Figure 6:
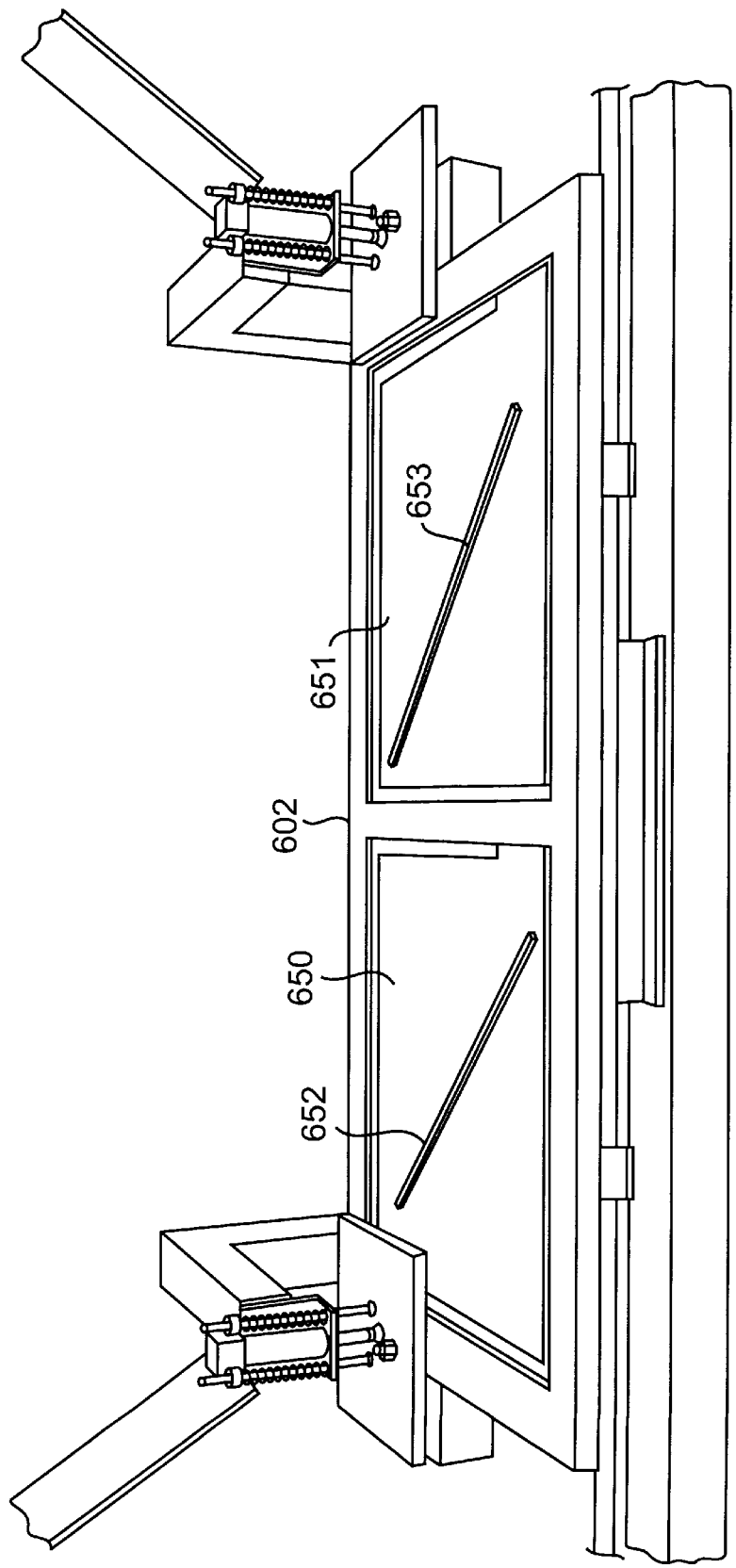
FIG. 6 shows a front view of the imaging system of FIG. 1 with the easel cover remove exposing translucent lighting plates and spacer bars.

FIG. 6 shows a front view of the apparatus with the easel cover removed. In various embodiments, the easel includes two recessed areas 650 and 651 which are coupled to a vacuum source. Spacer bars 652 and 653 are placed in each recessed area to prevent the easel cover, which is preferably formed of a perforated metallic surface, from being drawn into the recessed areas when the vacuum is applied. Images are placed on the perforated easel cover and are drawn tightly to the easel cover surface when a vacuum is present. In one embodiment, a vacuum coupling is provided through the apparatus frame which mates with vacuum fittings (not shown) associated with each recessed area. In this manner, each recessed area is provided with a vacuum only when it is positioned beneath the camera. Other approaches are of course possible.

In various embodiments, the bottom of each recessed area 650 and 651 may comprise a translucent panel to allow light from underneath the apparatus to be projected through transparencies placed on the easel. When transparencies are used, the easel cover and spacer bars can be removed as the transparencies are usually quite flat and adhere naturally to the surface of the translucent panels. A single light "tunnel" may be arranged below the camera such that each translucent panel is illuminated when positioned below the camera.

Figure 7:
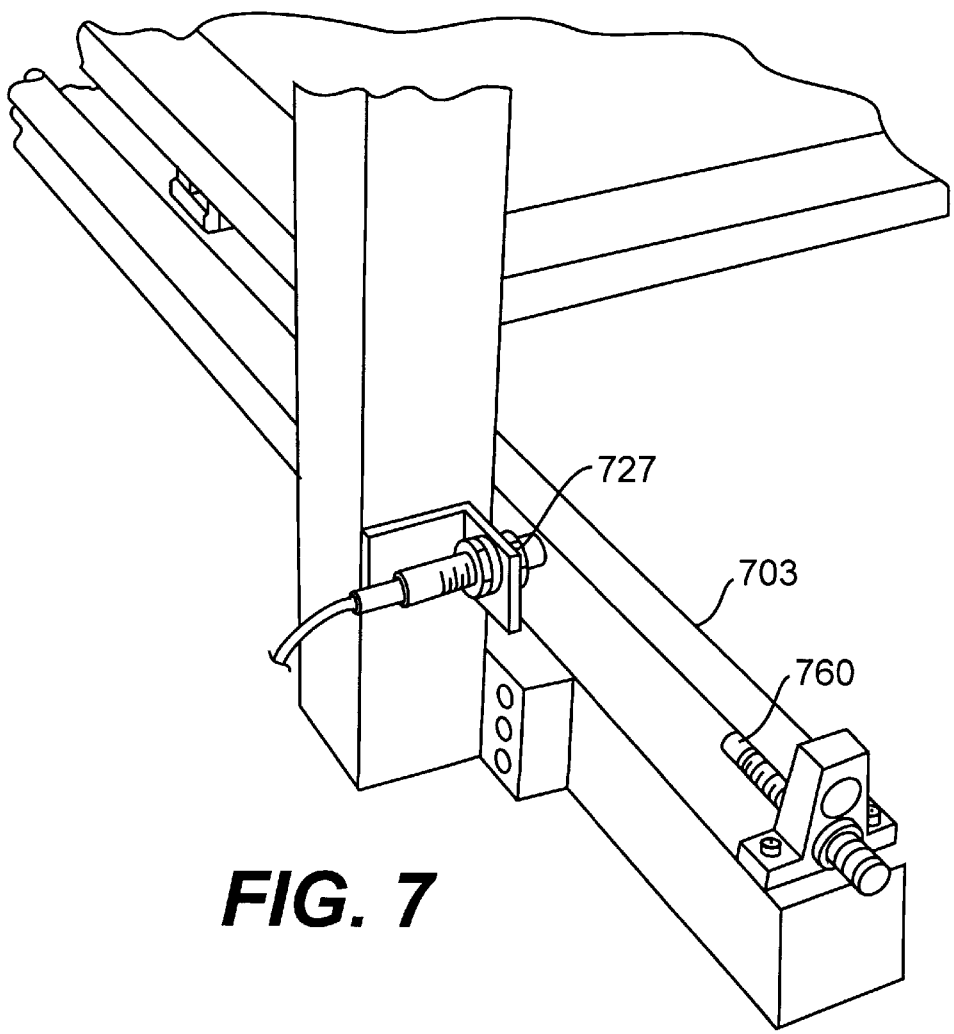
FIG. 7 shows an angled side view of the imaging apparatus of FIG. 1, highlighting a proximity detector switch disposed along a path of the easel railings.

FIG. 7 shows details of the placement of proximity detector switch 727. As indicated in FIG. 2, two proximity detector switches are disposed near an end of easel railing 703 to detect the position of the easel. Railing stop 760 terminates travel of the easel at the end of its motion. It will be readily apparent to those skilled in the art that various adjustments can be made to the railings, switches, air flow forces and piston parameters to adjust the speed and damping of the easel movement.

Figure 8A:
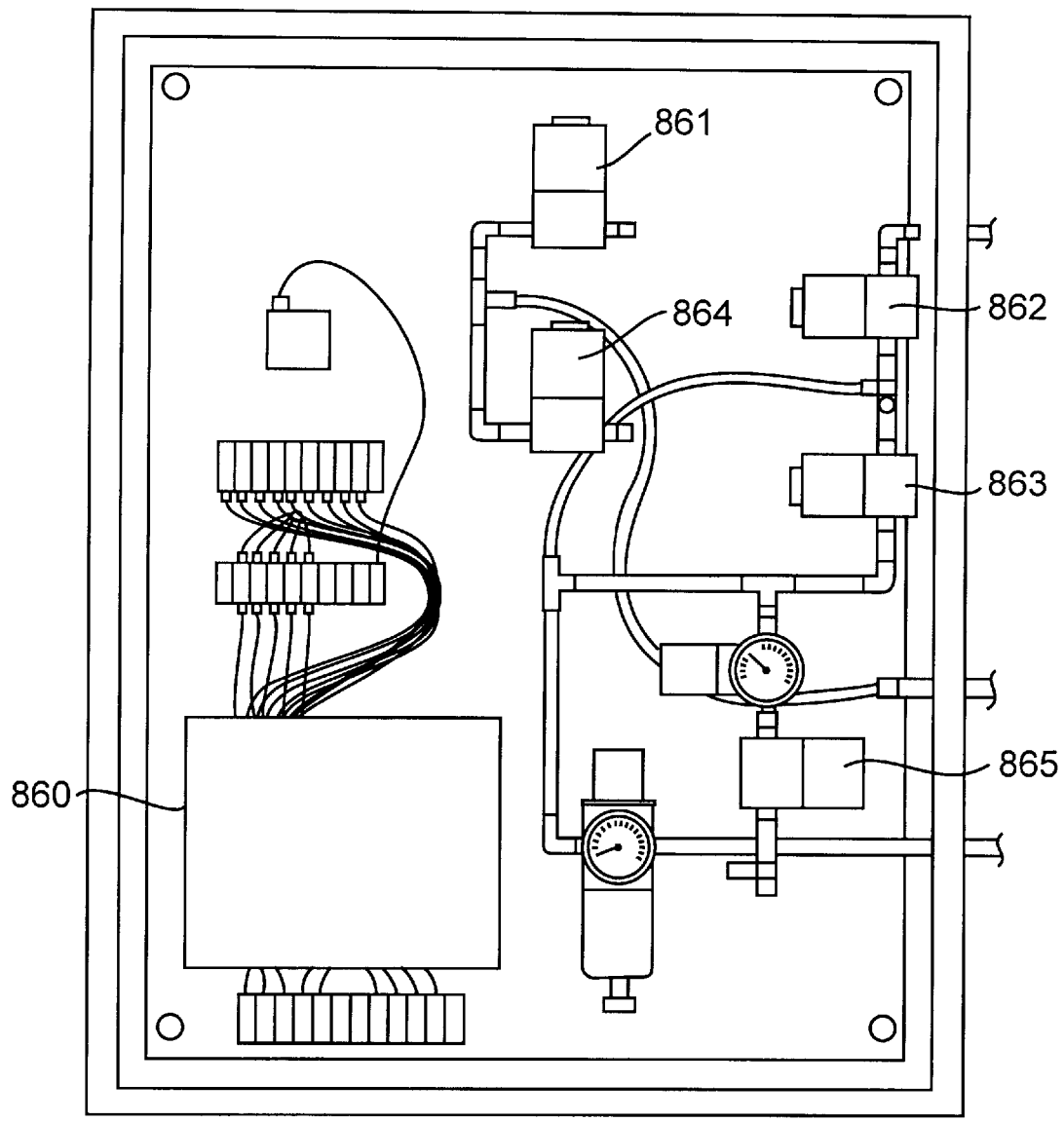
FIG. 8A shows an exposed view of control box including various electronic and pneumatic components for controlling the imaging apparatus of FIG. 1.

FIG. 8A shows one possible arrangement of electrical and pneumatic components in control box 112. Each of the components is commercially available and may be housed in a metal box. Five air solenoid valves (ASVs) are electrically controlled through a relay unit 860 under computer control. The computer may be interfaced to the unit through a parallel interface such that, for example, a single bit is used to control each ASV. When energized, each ASV allows air to flow therethrough. Two additional bits may be used for the proximity detector switches (i.e., these are input to the computer).

Figure 8B:
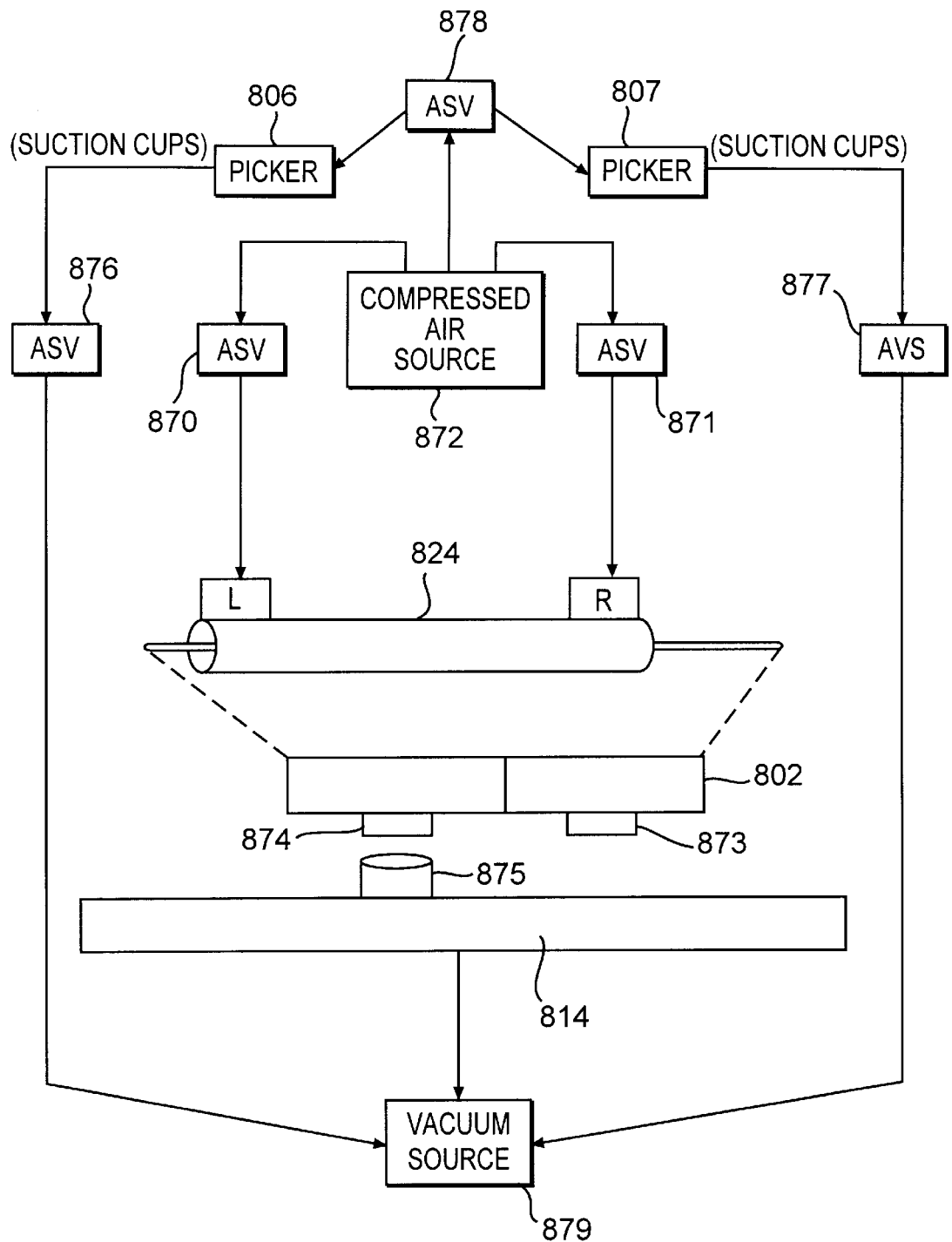
FIG. 8B shows schematically a pneumatic control system for controlling the imaging apparatus of FIG. 1.

FIG. 8B shows one possible schematic arrangement of the electrical and pneumatic components forming a system for controlling the easel and picker operations. Air piston 824 is actuated at each end by computer controlled ASVs 870 and 871 fed from compressed air source 872. As explained with reference to FIG. 2, only one ASV at a time is energized, such that rod 231 is forced to a left or right direction, causing a corresponding movement in easel 802.

The platen associated with each picker 806 and 807 is forced down by activating a corresponding ASV 878 which moves compressed air into corresponding air pistons on each picker. Instead of providing separate controls of each picker, both pickers can be forced down at the same time since only the picker positioned over the easel will be operative to lift an image. The suction cups on each platen are activated by energizing corresponding ASVs 876 and 877 which creates the vacuum through vacuum source 879.

A vacuum under the left and right image areas of easel 802 (corresponding to recessed areas 650 and 651 of FIG. 6) can be selectively created through vacuum fittings 874 and 873 underneath easel 802. These fittings mate with fitting 875 on frame 814 which is coupled to vacuum source 879. When easel 802 is positioned under the camera, a corresponding fitting 874 or 873 mates with fitting 875 to link vacuum source 879 to the corresponding recessed chamber (see FIG. 6, chambers 650 and 651). The vacuum can be conducted through frame 814.

Figure 9A:
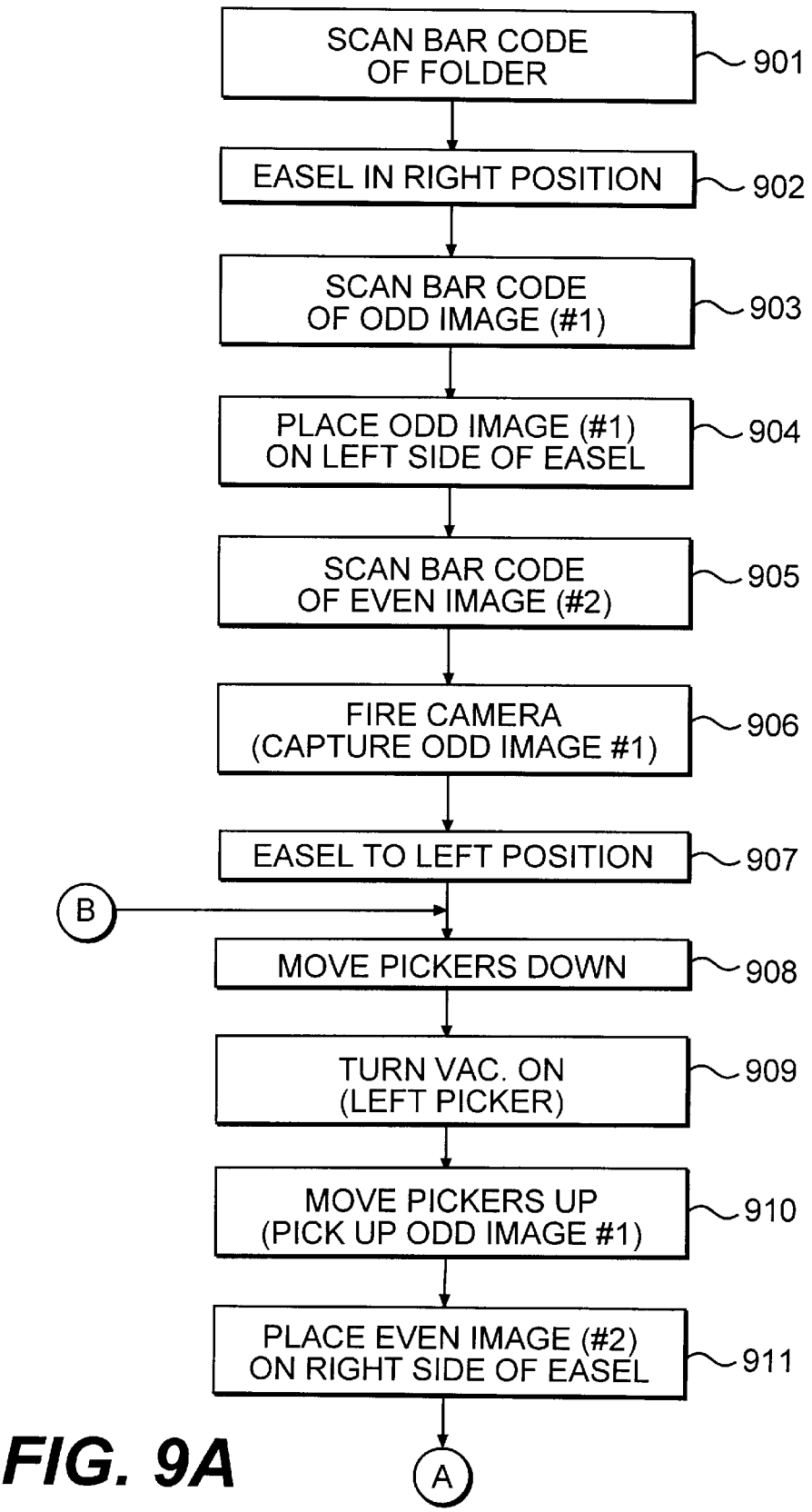
FIGS. 9A and 9B show steps which may be performed in accordance with various methods of the invention.
Figure 9B:
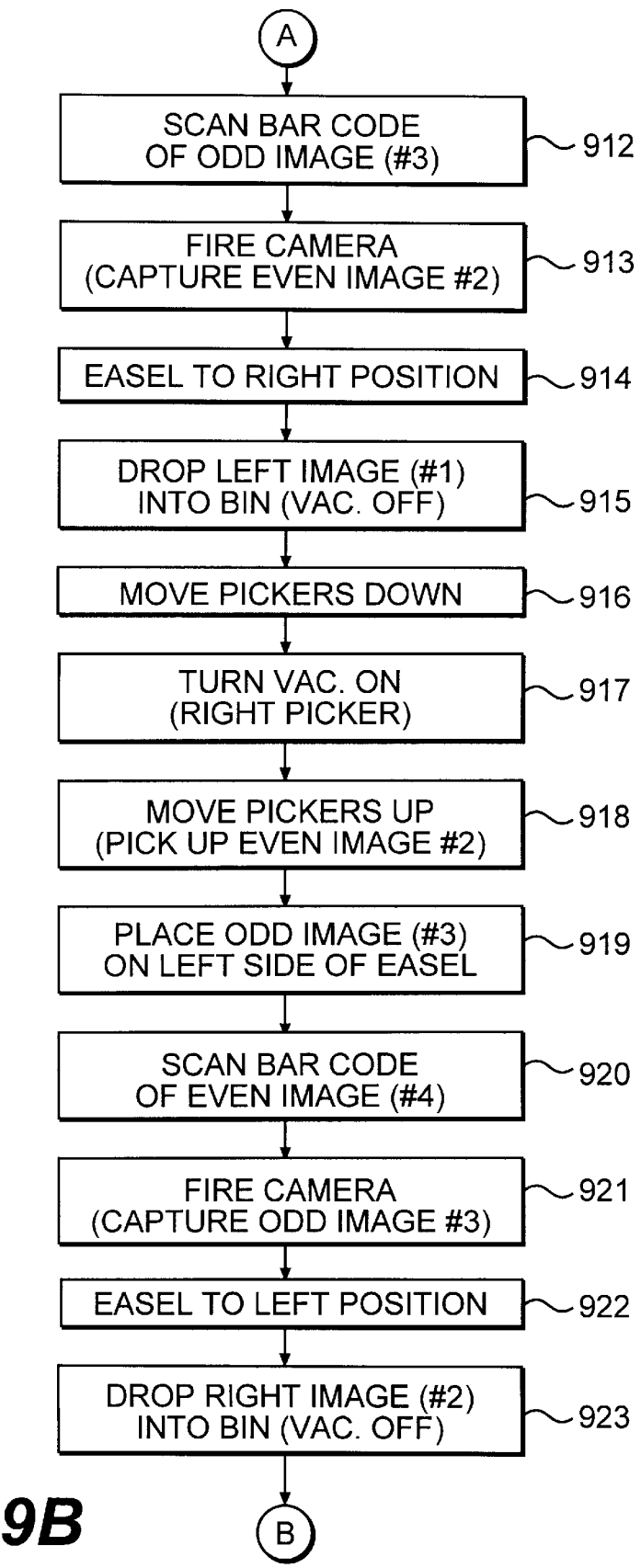

Turning now to FIG. 9A, various method steps will be explained in accordance with operating the apparatus. It is assumed that a bar code label generating program on computer 113 is used to generate bar code labels for each image (such as photographs, magazine pages and the like). Additionally, a bar code label may be generated for a folder into which the images are placed, and a bar code label may also be generated for the film to be placed in camera 111. Bar code generating programs are well known and no further elaboration is required. The bar code labels may have an adhesive backing so that they can be easily removed and placed on images, folders and film.

Reference will now be made to FIG. 9A in conjunction with FIG. 1. Beginning in step 901, the bar code on a folder of images is scanned into computer 113 using bar code scanner 115. Next, in step 902, the easel is moved to the right hand position under computer control (see FIG. 1) if not already there. In step 903, the bar code from an odd numbered image (i.e., image #1) is scanned into the computer. Next, in step 904, the odd image (image #1) is placed on the left side (102a) of the easel, beneath computer controlled camera 111. The vacuum fitting associated with image area 102a mates with the corresponding vacuum fitting attached to the apparatus frame, thus drawing the image tightly to the easel surface.

In step 905, the bar code of the next even numbered image (i.e., image #2) is scanned into the computer. Upon scanning this next bar code, the computer in step 906 automatically fires camera 111 in conjunction with strobe lights 108 and 109 to capture the odd image (i.e., image #1) which was previously placed on image area 102a. Thereafter, in step 907, the easel is moved to the left position under computer control so that the image on area 102a is under picker 106. Then in step 908 the pickers are moved downward and, in step 909, the vacuum for the left picker is turned on to attract the image which was placed area 102a to the suction cups on the left picker.

In step 910, the pickers are raised under computer control by releasing the picker air pistons, so that the odd image (#1) is picked up off the easel. Then, in step 911, the human operator places the even image (#2) on the right side of the easel on image area 102b, which is beneath camera 111, and in step 912 (see FIG. 9A), the bar code for the next odd image (#3) is scanned. Upon scanning this next bar code, the computer fires camera 111 to capture a picture of the previous even image (#2). Thereafter, the easel is moved to the right position under computer control in step 914.

In step 915, the image attached to the left picker is dropped into image bin 104 by turning off the vacuum to the left picker. Then, in step 916, the pickers are moved downward again, and in step 917 the vacuum for the right picker is turned on (which is now over area 102b holding recorded image #2). In step 918, the pickers are moved upward, thus picking up the even image from image area 102b, and the human operator places the next odd image (#3) onto the left side of the easel in area 102a. Thereafter, in step 920, the bar code of the next even image (#4) is scanned, and the computer in step 921 fires the camera to capture a picture of the previous odd image (#3).

In step 922, the easel is again moved to the left position, and the even image (#2) previously picked up by the right picker is dropped into drop bin 105 by turning off the vacuum for the right picker. Thereafter, the process repeats at step 908 (see FIG. 9A) by moving the pickers down to pick up the previous odd image (#3).

The foregoing process provides an increased level of automation over conventional imaging techniques because the human operator need only scan bar codes of the images and place the images on the next available area on easel 102. The computer controlled apparatus automatically handles the firing of the camera, the positioning of the easel, and the firm holding and removal of images from the easel. Moreover, because the images are bar coded and associated with specific frames in camera 111, the tracking of images can be greatly automated.

Figure 10:
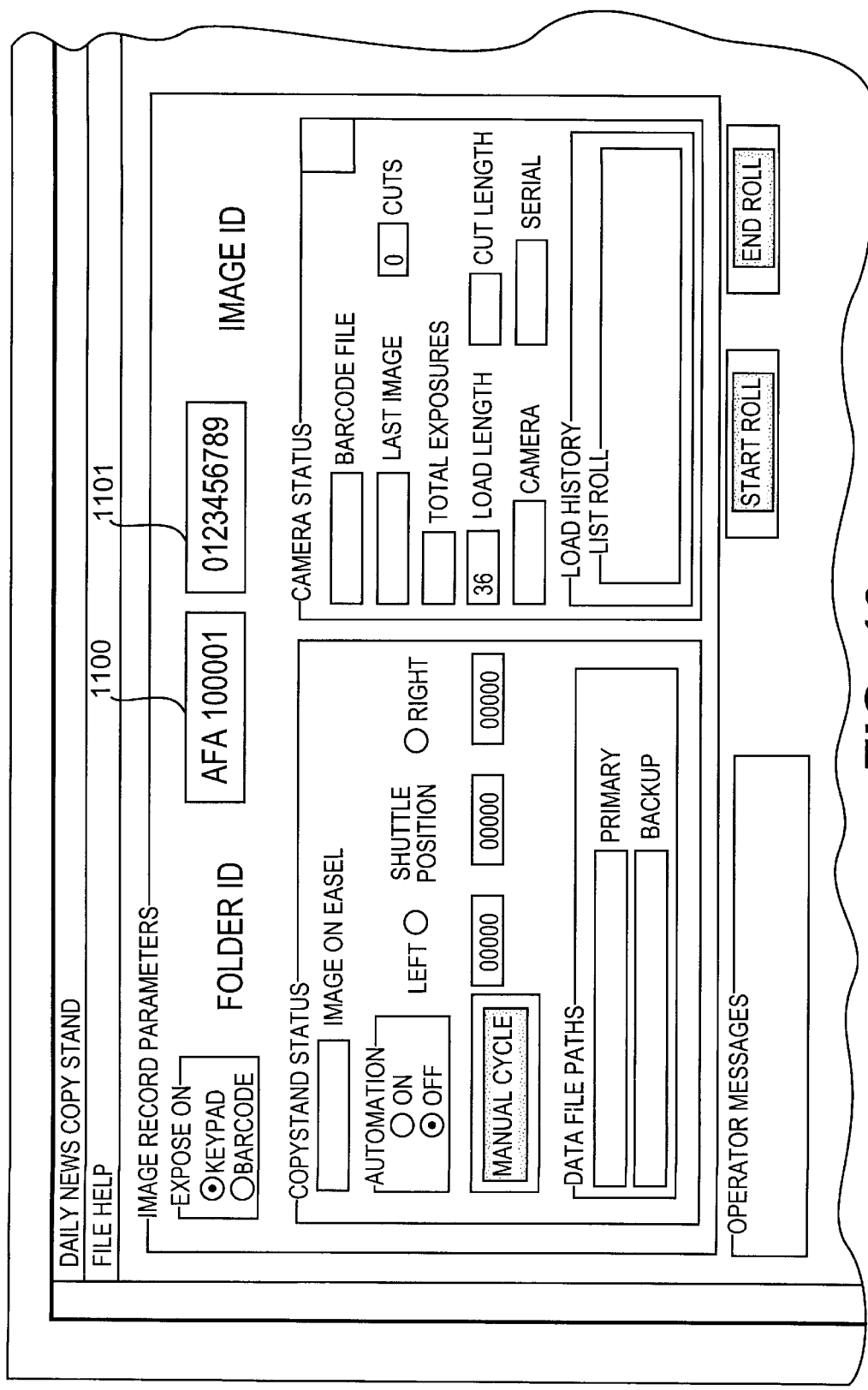
FIG. 10 shows a computer screen which may be used for inputting information and controlling the automated process.

FIG. 10 shows one possible computer screen which can be used for controlling various aspects of the apparatus and method steps. As shown in FIG. 10, a folder ID and image ID field may be input by way of the bar code scanner. Various fields for specifying file names, film length, and other parameters may of course be provided. Moreover, fields may be provided for the operator to control flash sequences, timing adjustments to the pickers and easel movement, and other parameters. The computer may be programmed to carry out the above described steps in any of various languages such as C, C ++ or Visual Basic, and the computer program may be stored on a computer readable storage medium such as a magnetic or optical disk.

It will be appreciated that a single vacuum picker and drop bin (e.g., picker 106 and bin 104) could be used instead of dual bins and pickers. The use of two pickers, however, allows for somewhat faster processing due to the settling time required after every easel movement. If the easel must be moved twice for every image (once to move beneath the picker and again to return to the camera ready position), a longer period of time will generally be required to process images. However, the resulting images will not be interleaved across two bins.

Moreover, it is apparent that bar code labels associated with photograph could be scanned prior to being attached to the photographs. Other deviations in the ordering of steps are of course possible without deviating from the principles of the invention.

In various embodiments, a high-capacity roll of film comprising 250 exposures may be used. However, because film from camera 111 may be digitized using a scanner which can only handle film in 36-frame segments, it may be desirable to shoot a blank frame after every 36 shots to create a space between 36-frame segments. This blank frame can also be automatically shot under the control of computer 113. Moreover, the film segment length (e.g., 36 frames, 24 frames, etc.) can be programmed as a parameter in computer 113 so that it can be easily changed. Following the shooting of film in camera 111, the film may be developed and cut into segments of e.g., 36 frames each. The film segments may then be digitized using any of a variety of commercially available scanners, wherein each frame from each segment can be associated with a corresponding bar code read from the back of the original photograph from which the frame was shot.

Because computer 113 maintains an association between bar codes on each image and the current frame number in camera 111, it can create a file which lists these associations. Placing a bar code on the film itself also allows for easy cross tracking of images. The use of bar codes avoids the need for operators to enter data manually, thus eliminating errors which might otherwise result. When the film is developed and scanned in a digitizer, each frame may be stored in a file corresponding to the bar code of the film and a frame indicator. Bar codes may be placed directly on the front of each image so that the image itself includes a facsimile of the bar code. When the image is photocopied, the bar code will appear on the photocopy and this photocopy can be provided to an outside editorial service for typing information associated with the image. Bar codes thus allow information about the image to be tracked extensively throughout a system.

Depending on the type of film scanner used, it may be necessary to re-order frames are they are digitized. One type of Kodak scanner, for example, scans the film backwards; in that case, the bar codes associated with the frames would need to be ordered in reverse. The computer can also account for a "blank" frame shot between each 36-frame sequence.

When a digital camera is used instead of a film camera, images may be transferred directly into the computer and associated with file names.

While a manual camera mounting adjustment has been described, it is of course possible to use an automated camera mount which would allow the computer to control the height of the camera to accommodate different image sizes, for example.

It is apparent that many modifications and variations of the present invention are possible, and references to specific values are by example only. It will be appreciated, for example, that the images which may be processed using the invention could comprise black and white, color, digitally produced or any other type of image. The method steps of the invention may be practiced in a different ordered sequence from that illustrated without departing from the scope of the invention. It is, therefore, to be understood that within the scope of the appended claims the invention may be practiced otherwise than as specifically described.

I claim:

1. An image processing system comprising:

a frame;

a device mount for holding an image capture device above the frame;

a vacuum picker disposed above the frame;

an easel horizontally movable along the frame between a first position under the device mount and a second position under the vacuum picker;

driving means for driving the easel between the first position and the second position under computer control;

picker controlling means for controlling the vacuum picker to pick up an image placed on the easel; and a computer coupled to the driving means and the picker controlling means, for causing the driving means to drive the easel from the first position to the second position after an image capture operation, and for causing the vacuum picker to pick up an image when the easel is in the second position.

2. The system of claim 1, further comprising a camera mounted in the device mount, and wherein the computer is coupled to the camera and includes means for causing the camera to fire while the easel is in the first position.

3. The system of claim 2, further comprising a bar code scanner for scanning a bar code, and wherein the computer includes means for causing the camera to fire after scanning a bar code for a next image to be placed on the easel.

4. The system of claim 1, wherein the vacuum picker include an air piston, and wherein the computer controls the vacuum picker to pick up the image by controlling the air piston.

5. The system of claim 4, wherein the vacuum picker comprises a plurality of suction cups coupled to a vacuum source, and wherein the computer causes the image to be picked up by activating the vacuum source.

6. The system of claim 1, wherein the easel comprises a perforated image surface coupled to a vacuum source through a recessed area.

7. The system of claim 6, wherein the recessed area is coupled to the vacuum source through a vacuum fitting which is selectively engaged while the easel is in the first position.

8. The system of claim 1, further comprising an image drop bin, disposed beneath the vacuum picker, into which images picked up by the vacuum picker are dropped.

9. An image processing system, comprising:

a frame;

a left vacuum picker attached to the frame and disposed above a left side of the frame;

a right vacuum picker attached to the frame and disposed above a right side of the frame;

a reciprocating easel mounted above the frame and having a left image area and a right image area, the reciprocating easel being movable between a first position wherein the right image area is beneath the right vacuum picker and a second position wherein the left image area is beneath the left vacuum picker; and a piston, coupled to the reciprocating easel, which drives the reciprocating easel back and forth between the first position and the second position.

10. The image processing system of claim 9, further comprising a device mount disposed between the left and right vacuum pickers and arranged such that when the reciprocating easel is in the first position, the left image area is beneath an image capture device mounted in the device mount.

11. The image processing system of claim 10, further comprising a computer coupled to the left and right vacuum pickers and to the piston, wherein the computer is programmed to move the reciprocating easel between the first and second positions in sequence with firing the image capture device.

12. The system of claim 11, wherein the computer is programmed to, in sequence:

(1) read a bar code associated with an image to be placed on the reciprocating easel;

(2) fire the image capture device to capture an image placed on the reciprocating easel;

(3) move the reciprocating easel between the first and second positions; and (4) control the vacuum pickers to pick up an image on the reciprocating easel.

13. The system of claim 10, further comprising a left image drop bin disposed beneath the left vacuum picker and a right image drop bin disposed beneath the right vacuum picker, each image drop bin for holding images dropped from each respective vacuum picker after the reciprocating easel has moved away from the respective vacuum picker.

14. The system of claim 9, wherein each vacuum picker comprises a spring-biased air piston which is driven downward under computer control and a plurality of vacuum suction cups on an underside of a platen.

15. The system of claim 9, wherein the left and right image areas each comprise a perforated surface which is selectively coupled to a vacuum source.

16. The system of claim 15, wherein the left and right image areas each include a recessed translucent panel beneath the perforated surface, wherein the perforated surface is removable to expose the translucent panels.

17. The system of claim 9, further comprising:

a compressed air source coupled to the piston through a first computer controlled air valve; and a vacuum source coupled to suction cups on each vacuum picker through a second computer-controlled valve.

18. The system of claim 17, wherein the compressed air source is coupled to each vacuum picker to urge each vacuum picker downward under computer control.

19. A method of processing a set of images using a computer, comprising the steps of:

(1) placing a first image on a first side of a reciprocating easel;

(2) under control of the computer, firing an image capture device to capture a representation of the first image;

(3) under control of the computer, moving the reciprocating easel to a position such that the first image is beneath a first vacuum controlled picker;

(4) placing a second image on a second half of the reciprocating easel;

(5) under control of the computer, picking up the first image using the first vacuum controlled picker; and (6) under control of the computer, firing the image capture device to capture a representation of the second image.

20. The method of claim 19, further comprising the steps of:

(7) under control of the computer, moving the reciprocating easel to a position such that the second image is beneath a second vacuum controlled picker; and (8) under control of the computer, releasing the first image from the first vacuum controlled picker.

21. The method of claim 19, wherein steps (5) and (6) are performed in the reverse order.

22. The method of claim 19, further comprising the step of, prior to step (1), scanning into the computer a bar code associated with the first image.

23. The method of claim 22, further comprising the step of associating in the computer a bar code from a film frame in the image capture device with the bar code scanned from the first image.

24. The method of claim 20, wherein steps (3) and (5) comprise the step of activating a computer-controlled air solenoid valve to supply air from a compressed air source.

* * * * *